(12) United States Patent
Liesche et al.

(10) Patent No.: US 9,692,794 B2
(45) Date of Patent: Jun. 27, 2017

(54) AGGREGATION OF SENSOR APPLIANCES USING DEVICE REGISTERS AND WIRING BROKERS

(71) Applicant: INTERNATIONAL BUSINESS MACHINES CORPORATION, Armonk, NY (US)

(72) Inventors: Stefan Liesche, Newton, MA (US); Thomas Stober, Herrenberg (DE); Stefan Weigeldt, Weil Im Schoenbuch (DE); Martin Welsch, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 14/349,697

(22) PCT Filed: Oct. 4, 2012

(86) PCT No.: PCT/IB2012/055321
§ 371 (c)(1),
(2) Date: Apr. 4, 2014

(87) PCT Pub. No.: WO2013/054237
PCT Pub. Date: Apr. 18, 2013

(65) Prior Publication Data
US 2014/0250234 A1    Sep. 4, 2014

(30) Foreign Application Priority Data
Oct. 12, 2011    (EP) .................................... 11184788

(51) Int. Cl.
*H04L 29/06*    (2006.01)
*H04L 29/08*    (2006.01)
*H04W 4/00*    (2009.01)

(52) U.S. Cl.
CPC ........ *H04L 65/1073* (2013.01); *H04L 67/025* (2013.01); *H04W 4/005* (2013.01)

(58) Field of Classification Search
CPC ... H04L 67/025; H04L 65/1073; H04L 41/08; H04L 41/22; H04L 67/125; H04L 67/303; H04L 69/08; H04L 69/24; H04W 4/005
(Continued)

(56) References Cited

U.S. PATENT DOCUMENTS 6,741,855 B1    5/2004    Martin et al.
2006/0010240 A1    1/2006    Chuah
(Continued)

FOREIGN PATENT DOCUMENTS

CN    101063884 A    10/2007
CN    101964722 A    2/2011
(Continued)

OTHER PUBLICATIONS

International Searching Authority—International Search Report and Written Opinion for International Application No. PCT/IB2012/055321, Mailed Mar. 7, 2013.
(Continued)

*Primary Examiner* — Michael C Lai
(74) *Attorney, Agent, or Firm* — Nolan M. Lawrence (57) ABSTRACT

The invention provides for a computer system, comprising a device register for creating and registering one or more device objects. At least one device object of the one or more device objects is configured for communicating with a network connector of a sensor appliance via a network connection. The device object is configured for exposing at least one parameter of the sensor appliance by declaring its capabilities. The computer system further comprises an aggregation model for aggregating the at least one parameter of the at least one device objects; a set of wiring definitions (Continued)

descriptive of raised events created by changes or updates in the at least one parameter; and a wiring broker for updating the aggregation model in accordance with the raised events.

15 Claims, 7 Drawing Sheets

(58) Field of Classification Search
USPC .......................................................... 709/228
See application file for complete search history.

(56) References Cited

U.S. PATENT DOCUMENTS

| | | |
|---|---|---|
| 2010/0287240 A1 | 11/2010 | Rice et al. |
| 2010/0299615 A1* | 11/2010 | Miluzzo ................. H04W 4/02 715/752 |
| 2011/0022733 A1* | 1/2011 | Karaoguz ............. H04L 67/303 709/247 |
| 2011/0138310 A1* | 6/2011 | Gomez ................ H04L 41/082 715/769 |

FOREIGN PATENT DOCUMENTS

| | | |
|---|---|---|
| CN | 10287593 A | 6/2011 |
| CN | 102087593 A | 6/2011 |

OTHER PUBLICATIONS

UKIPO Patent Application No. GB1404277.4, Examination Report mailed Apr. 8, 2014.

\* cited by examiner

AGGREGATION OF SENSOR APPLIANCES USING DEVICE REGISTERS AND WIRING BROKERS

BACKGROUND

The invention relates to the aggregation of sensors and/or actuators, in particular to the aggregation of sensors and/or actuators by the use of a device register and a wiring broker.

The connection of various devices or sensor elements involves the following steps: 1. definition of the kind of data to be exchanged, 2. specification and agreement on a suitable protocol, 3. implementation of the protocol on both sides, and 4. communication can then be established.

The communication that is now established is strictly bound to the limits as defined in step 1. In this case it is known at design time which elements are to be connected to which others and what specific intended mode of operation or contribution is expected. Such connections can then rely on well defined low level specified protocols. The system designers can explicitly plan the expected exchange of information both semantically and syntactically on a low level. In many cases such designs are even done on a peer-to-peer basis. Controllers address explicitly their target elements in a bilaterally defined way. In order to achieve at least some abstraction and establish some re-usability sometimes several different, almost always incompatible, protocols are defined to generalize addressability and inter connectivity.

In the domain of house automation examples are: EnOCean, KNX, Modbus, M-Bus. Sometimes yet another higher level protocol then tries to map those lower level protocol into a common denominator. In the aforementioned example this would be Obix (Object building exchange). Obix tries to abstract the four lower level protocols into a well defined common XML syntax.

Using Obix then it would be possible e.g. to turn the light on in a building without knowing the details of either of the lower level protocols and independent from which one of these protocols is actually used in the specific building instance at hand. However, in order to make this happen the Obix protocol needs a semantically and syntactically well defined, rigid, low level mapping of all the control elements. In this example it must explicitly know about the action of 'turning on the light' and how this is to be mapped to the lower level protocols. Each and every possible action and its meaning must be specified in detail for the system to work properly. Explicit semantics is required for the connectivity of the different sensors/actuators/devices.

One of the most severe drawbacks of this approach is its lack of scalability. With each new device and each new possible connection and sensor or actuator control, the system needs explicit definitions for the interaction pattern to all other already existing elements that the new element might be connected to. This lead sooner or later into an unmanageable N×M relationship problem.

SUMMARY

In one embodiment of the present invention, a computer system comprises: a hardware device register for creating and registering one or more device objects, wherein at least one device object of the one or more device objects is configured for communicating with a network connector of a sensor appliance via a network connection, wherein the device object is configured for exposing at least one parameter of the sensor appliance by declaring its capabilities; hardware logic comprising an aggregation model for aggregating the at least one parameter of the at least one device object; hardware storage logic containing a set of wiring definitions descriptive of raised events created by changes or updates in the at least one parameter; and a wiring broker for updating the aggregation model in accordance with the raised events.

In one embodiment of the present invention, a method and/or computer program product connects network connectable independent devices by a user interface. The method comprises: connecting, by one or more processors, network connectable devices to a network; visualizing, by one or more processors, each of said network connectable devices on said user interface by an abstraction layer, wherein said each of said network connectable devices is a device from a group consisting of a sensor and an actuator; registering, by one or more processors, each of said network connectable devices with said abstraction layer and declaring capabilities of said each of said network connectable devices by connecting said each of said network connectable devices with said user interface including the abstraction layer; and connecting, by one or more processors, selected network connectable devices with selected other devices via said abstraction layer in order to implement a user defined controller logic with a coherent system of decoupled devices, wherein said abstraction layer provides an infrastructure to poll for status changes of sensors and to trigger status changes of actuators, and wherein said abstraction layer is device and/or service independent by using a software abstraction layer.

BRIEF DESCRIPTION OF THE DRAWINGS

In the following, preferred embodiments of the invention will be described in greater detail by way of example only making reference to the drawings in which.

DETAILED DESCRIPTION

In the following, like numbered elements in these figures are either similar elements or perform an equivalent function. Elements which have been discussed previously will not necessarily be discussed in later figures if the function is equivalent.

Figure 1:
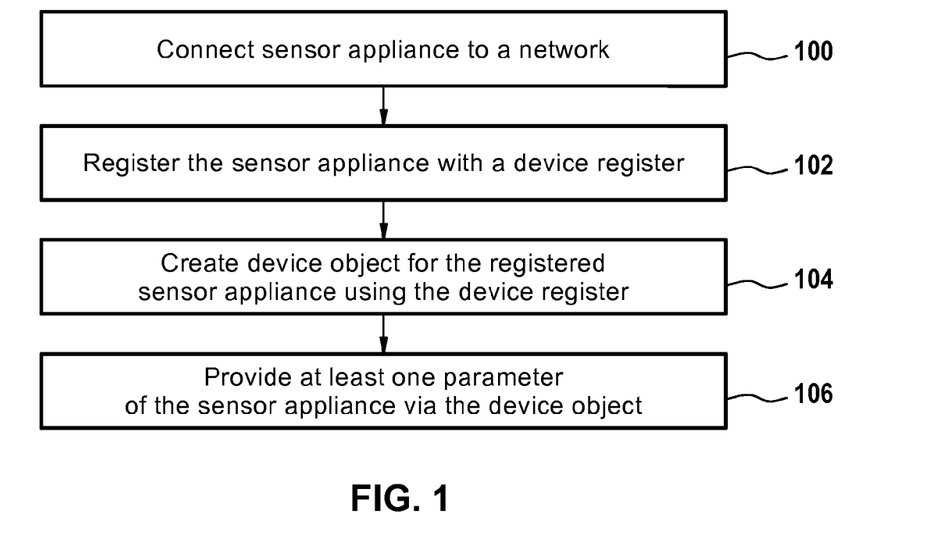
FIG. 1 shows a flow diagram which illustrates a method according to an embodiment of the invention.

FIG. 1 shows a flow diagram which illustrates a method according to an embodiment of the invention. In step 100 a sensor appliance is connected to a network. Next in step 102 the sensor appliance is registered with a device register. In step 104 the device register creates a device object for the registered sensor appliance. Finally in step 106 the device object provides at least one parameter of the sensor appliance.

Figure 2:
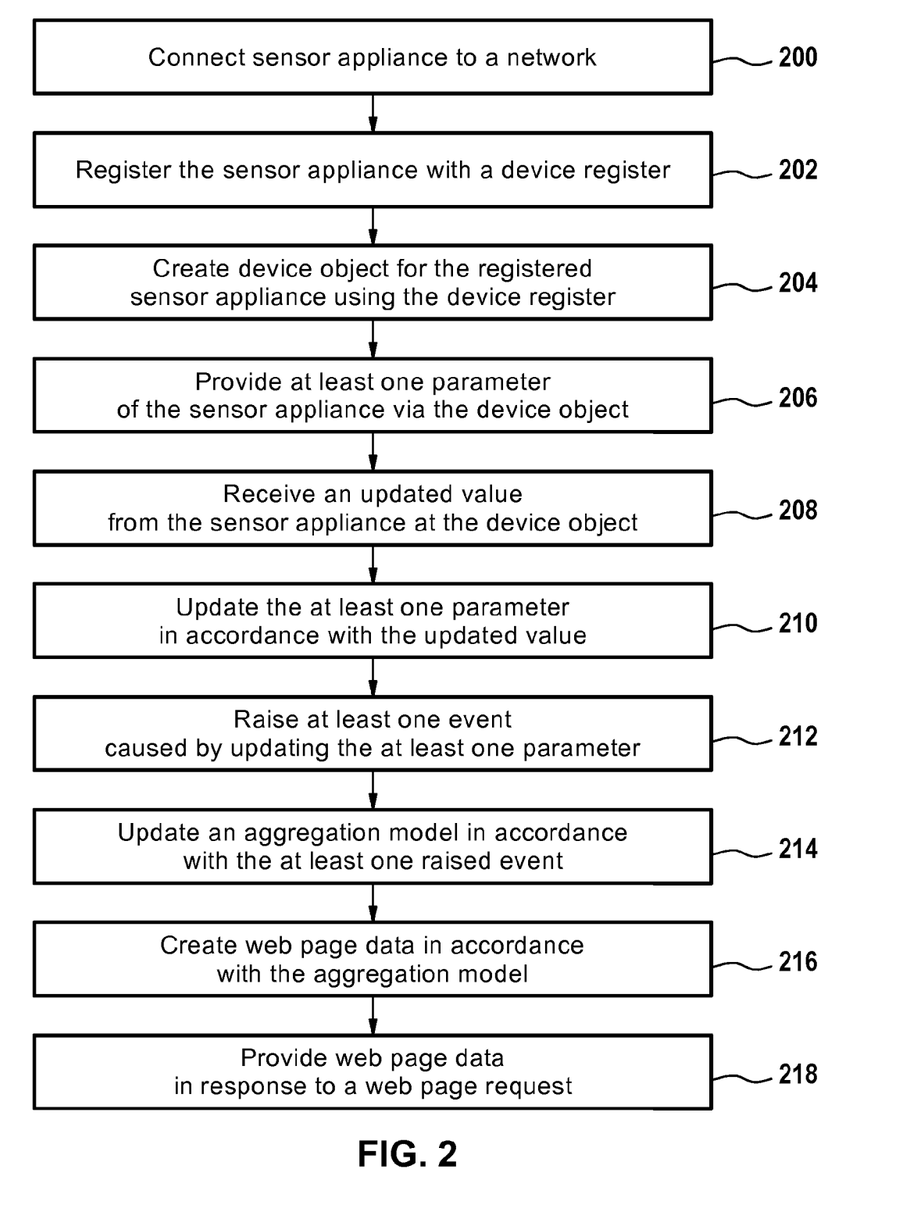
FIG. 2 shows a flow diagram which illustrates a method according to a further embodiment of the invention.

FIG. 2 shows a flow diagram which illustrates a method according to a further embodiment of the invention. First in step 200 a sensor appliance is connected to a network. Next in step 202 the sensor appliance is registered with a device register. Next in step 204 the device register creates a device object for the registered sensor appliance. In step 206 the device object provides at least one parameter of the sensor appliance. Next in step 208 an updated value from the sensor appliance is received by the device object. In step 210 the device object then updates the at least one parameter in accordance with the updated value. Next in step 212 at least one event is raised due to the updating of the at least one parameter.

Next in step 214 an aggregation model is updated in accordance with at least one raised event. The raised event may contain instructions on how to update the aggregation model. In step 216 webpage data is created in accordance with the aggregation model. Finally in step 218 webpage data is provided in response to a webpage request. This for instance may be transmitting the webpage data across the internet to a different computer system.

Figure 3:
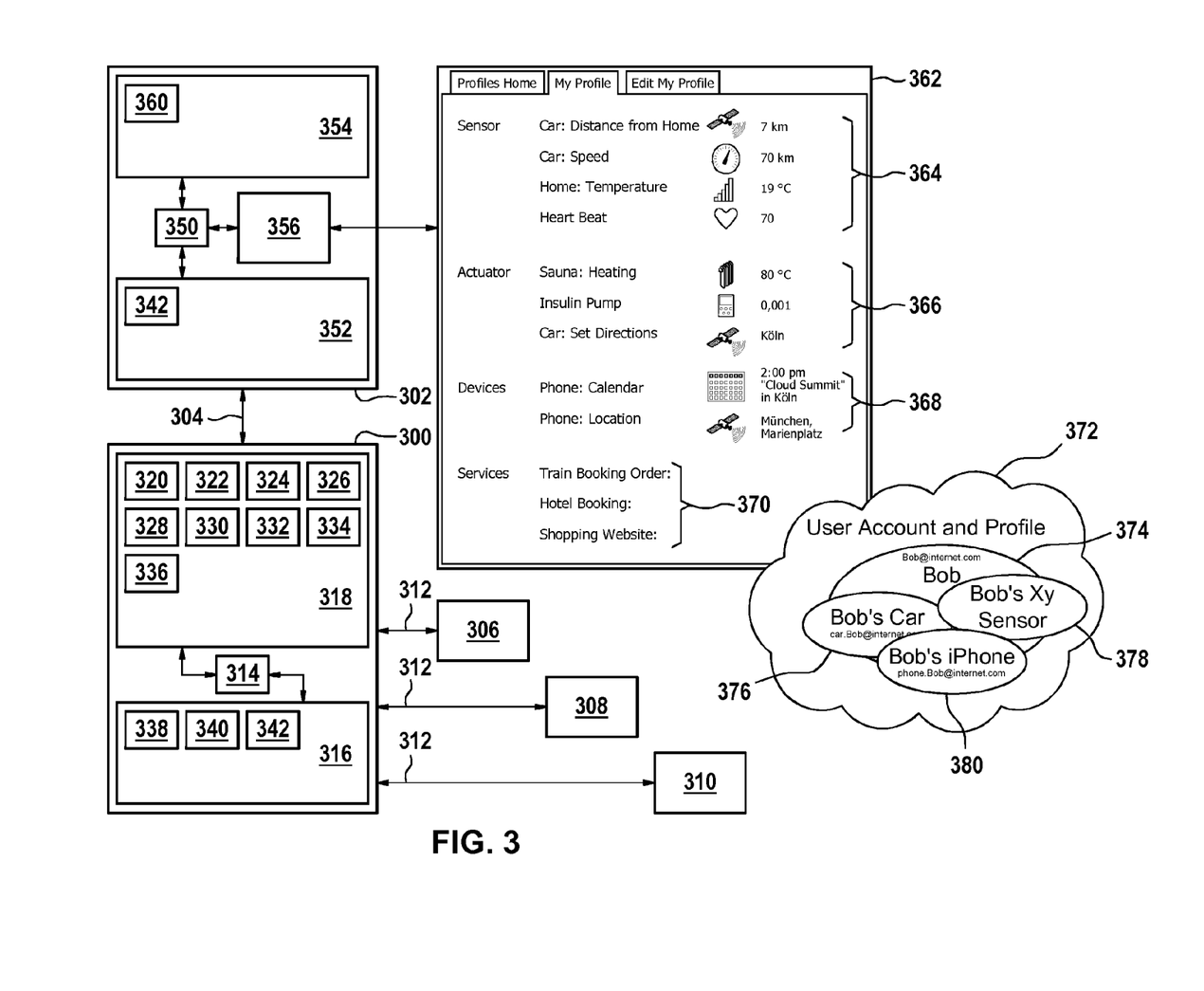
FIG. 3 illustrates a computer system according to an embodiment of the invention.

FIG. 3 illustrates a computer system according to an embodiment of the invention. There is a computer system 300 shown. There is a second computer system 302 connected to the computer system 300 by a network connection 304. The network connection 304 may for instance be an internet connection or other type of network connection such an Ethernet connection. There are a number of network appliances (devices), a first device 306, a second device 308, and a third device 310 each of which is connected by a network connection 312 to the computer system 300.

The computer system 300 comprises a processor 314 which is connected to computer storage 316 and computer memory 318. Within the computer memory 318 there is a device register 320. The device register 320 comprises machine executable code for implementing a device register which is able to create device objects 322, 324, 326. The computer memory 318 contains a first device object 322 for connecting the first device 306, a second device object 324 for connecting the second device 308 and a third device object 326 for connecting the third device 310. The memory 318 further contains a wiring broker 328. The computer memory 318 further contains an updated value 330 received from the first device 306. The updated value 330 results in an event 332 which is shown as being contained in the memory 318 as being raised. The raised event 332 causes an aggregation model updating module 334 to update an aggregation model 338 which is stored in the computer storage 316. The computer memory 318 further contains a webpage aggregator 336 for generating webpage data 342 using the aggregation model 338. The webpage data 342 is shown as being stored in the computer storage 316. The computer storage 316 further contains a set of wiring definitions 340 which are used to determine if an updated value 330 raises an event 332.

The second computer system 302 is shown as containing a processor 350 connected to computer storage 352 and computer memory 354. The processor is further connected to a display 356. The processor 350 sends a request to the computer system 300 to serve a webpage. The webpage data 342 was transferred from the computer system to the second computer system 302 via the network connection 304. The webpage data 342 is shown in the computer storage 352. The computer memory 354 is shown as containing a web browser 360. On the display 356 is a graphical user interface 362 being rendered by the web browser 360 using the webpage data 342. In this graphical user interface there are a number of data displays and control regions. The parameters 364 display sensor data 364. The parameters 366 illustrate actuator controls. The region 368 illustrates device controls 368 for example for controlling a Smartphone. The controls 370 illustrate service controls 370. These could be software services provided for performing duties or functions for the operator.

Adjacent to the user interface 362 is a cloud illustrating an ID verification service 372 which hosts a user account and profile 374. The first device object 322 may use the car profile 376 for using and verifying the connection of the first device 306. The sensor profile 378 may use the second device object 324 and the third device object 326 may use the phone profile 380 for connecting the third device 310. In this example there is a single processor 314 and a single computer system 300 which implements all components of the computer system. However, there may be any number of processors 314 distributed in any number of computer systems. In particular the device objects 322, 324, 326 and the device register 320 may be implemented on a separate computer system from the webpage aggregator 336.

Figure 4:
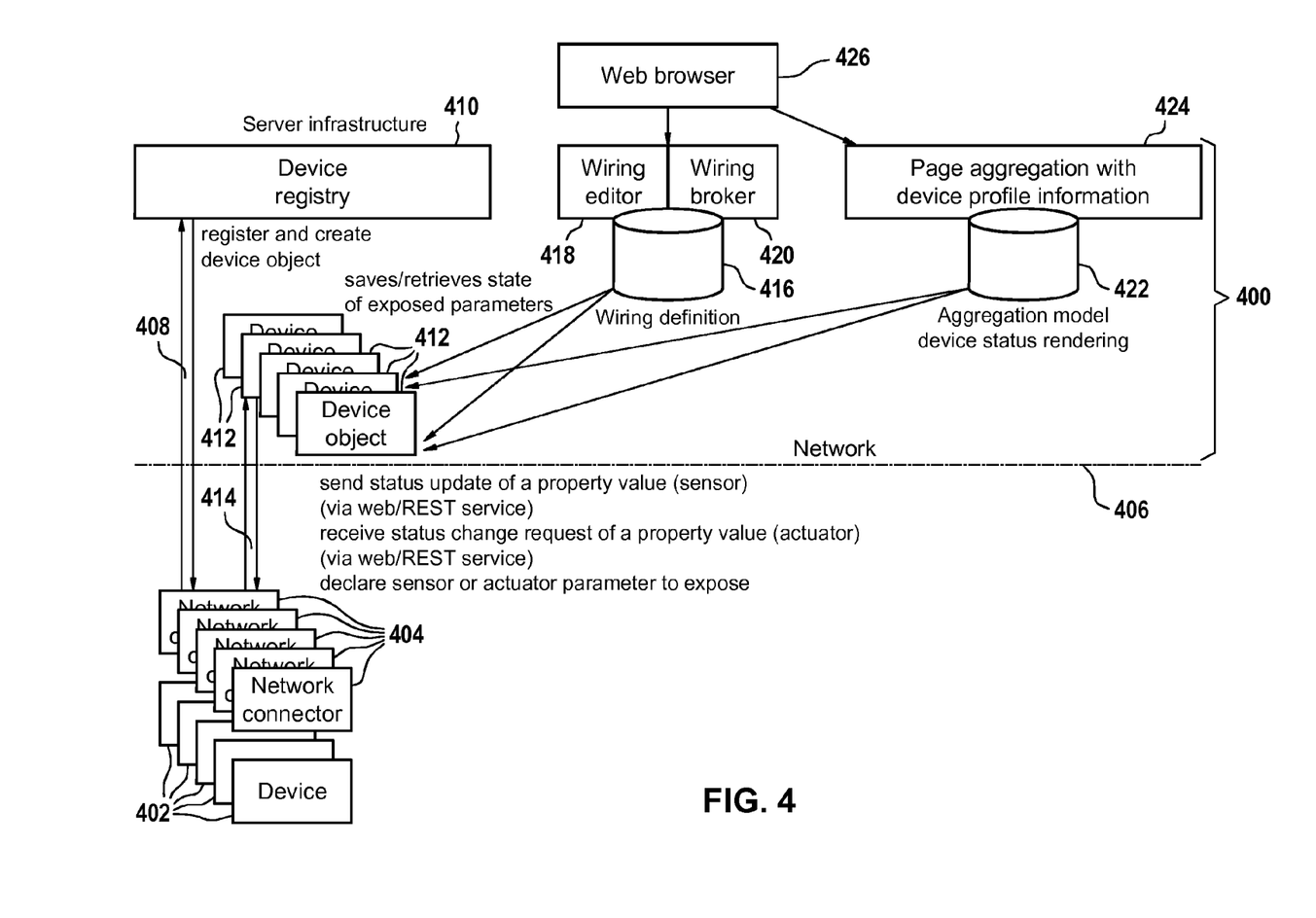
FIG. 4 shows a functional diagram of a computer system according to an embodiment of the invention.

FIG. 4 illustrates a functional diagram of the computer system 400 according to an embodiment of the invention. There are a number of devices or sensor appliances 402 each of which has its own network connector 404. The network connectors 404 are connected via a network connection 408 to a device registry 410. After a sensor appliance 402 registers with the device registry 410 the device registry 410 creates a device object 412 for each device appliance 402. The network connector 404 is then able to connect directly with the device object 412 using network connection 414. The device registry registers and creates device objects 412. Via the network connection 414 the device object and the associated network connector 404 can send status update of a property value for example for a sensor via a web or REST service, it can receive status change request of a property value for instance for an actuator via a web/REST service.

In some embodiments the network connector 404 can declare sensor or actuator parameters to expose. The device object 412 saves and/or retrieves state of exposed parameters. The device objects 412 expose various parameters. A set of wiring definitions 416 is used to control the effect of changing or updating an exposed parameter. There is a wiring editor 418 which can be used for modifying the wiring definitions 416 and a wiring broker 420 which uses the wiring definitions 416 to cause set values to be changed or the effect of a changed or updated property value which has been exposed. There is an aggregation model 422 which is used for either retrieving states of exposed parameters or setting the states of exposed parameters. The aggregation model 422 may enable page aggregation with device profile information 424. There is a web browser 426 which may be used for controlling the wiring editor 418 and/or for requesting the page aggregation in order to render a user interface using the aggregated device profile information.

Figure 5:
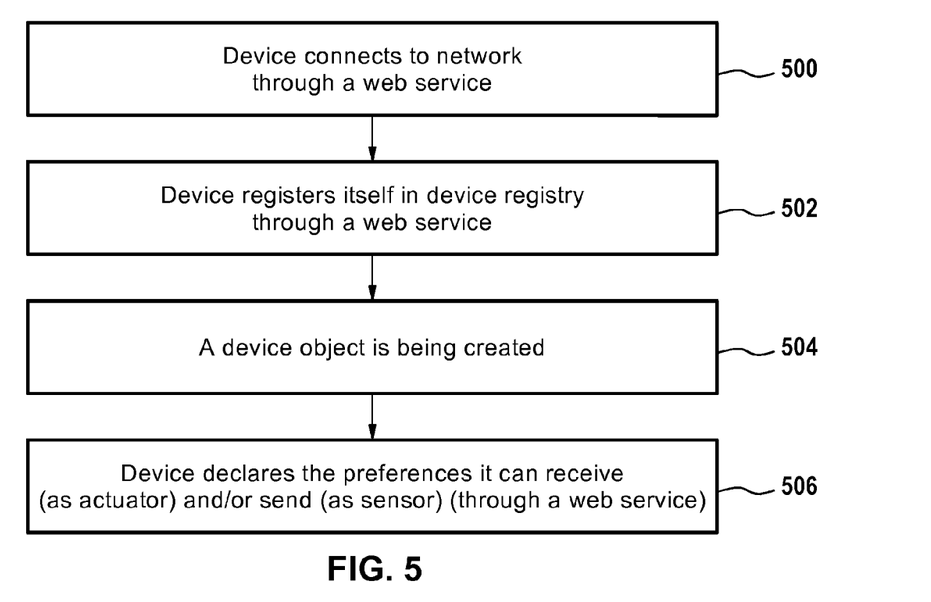
FIG. 5 shows a flow diagram which illustrates the connection of a device or sensor appliance to the computer system.

FIG. 5 shows a flow diagram which illustrates a method of connecting a device or sensor appliance to a computer system according to an embodiment of the invention. In step 500 a device or sensor appliance connects to a network through a web service. In step 502 the device registers itself in a device registry through a web service. Next in step 504 the device register creates a device object. Next in step 506 the device declares its preference and that it can receive if it is an actuator and/or send if it is a sensor through a web service.

Figure 6:
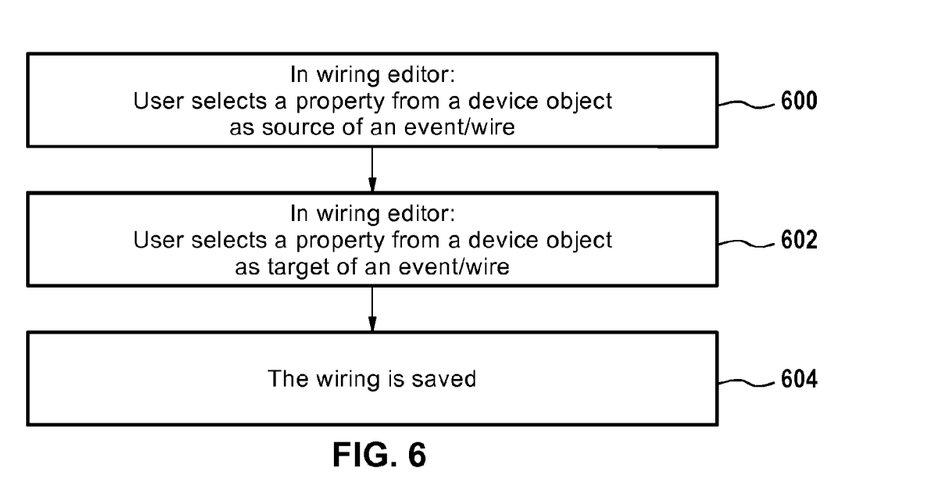
FIG. 6 shows a flow diagram which illustrates the operation of a wiring editor.

FIG. 6 shows a flowchart which illustrates steps performed by the wiring editor 418. In step 600 in the wiring editor a user selects a property from a device object as a source of an event or wire. Next in step 602 the user selects a property from a device object as a target of an event or wire. Next in step 604 the changed wiring is saved.

Figure 7:
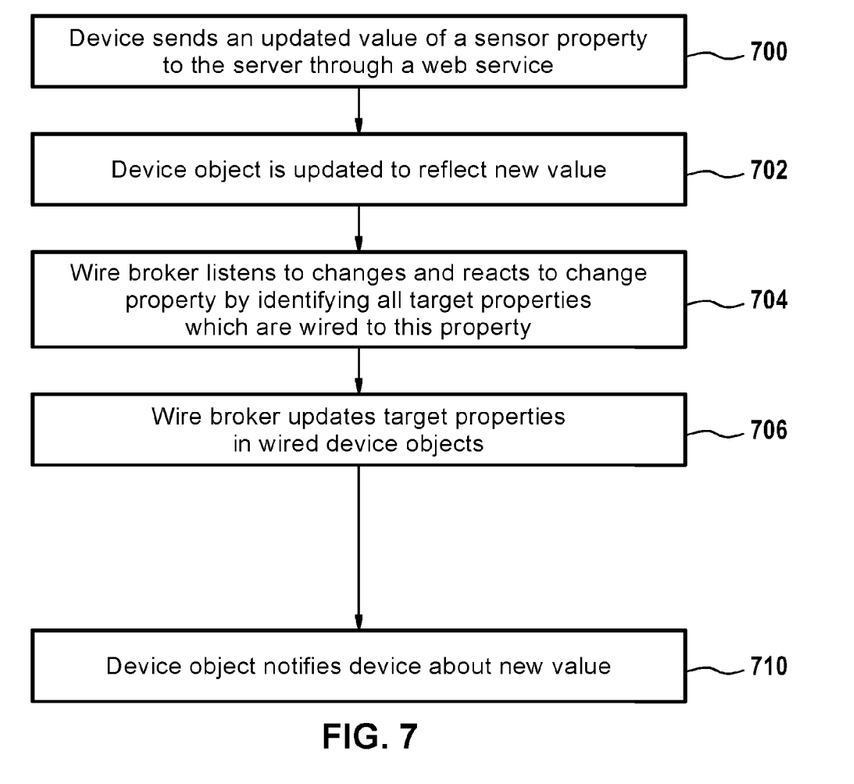
FIG. 7 shows a flow diagram which illustrates the operation of a wire broker.

FIG. 7 shows a flow diagram which illustrates the functioning of a wire broker according to an embodiment of the invention. In step 700 the device sends an updated value of a sensor property to the server through a web service. Next in step 702 a device object is updated to reflect the new value. The wire broker listens to changes and reacts to change properly by identifying all target properties which are wired to this property in step 704. Next in step 706 the wire broker updates target properties in the wired device objects. Finally in step 710 the device object notifies the device or sensor appliance about the new value. This notification may occur by a push service or by having the device poll for updates.

Figure 8:
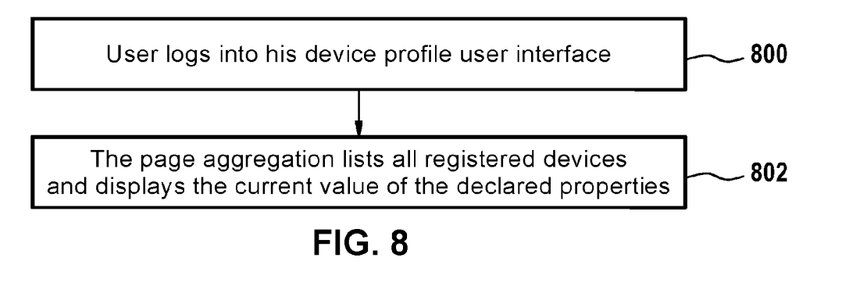
FIG. 8 shows a flow diagram which illustrates the use of a page aggregator.

FIG. 8 shows a flow diagram which illustrates the use of the page aggregator. In step 800 a user logs into his or her device profile using a user interface. Next in step 802 the page aggregator lists all registered devices and displays the current values of the declared properties.

Figure 9:
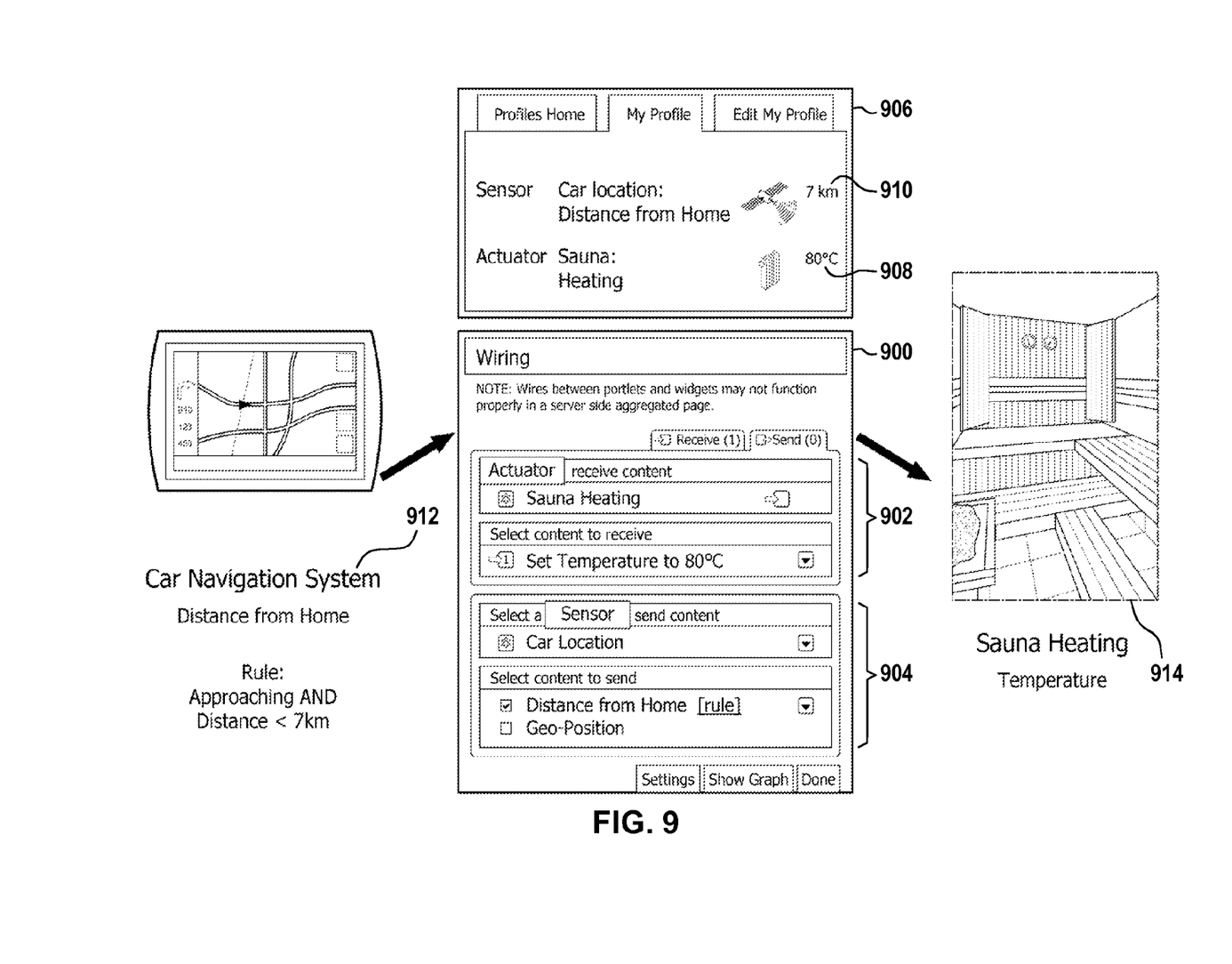
FIG. 9 illustrates the use of a graphical user interface to use a computer system according to an embodiment of the invention.

FIG. 9 is used to illustrate the functioning of the full system. A user interface 900 for controlling the wiring editor is shown. In one region there is an actuator wiring interface 902. In a second region there is a sensor wiring interface 904.

A graphical user interface 906 which illustrates an example of the page aggregation specified by the wiring in graphical user interface 900 is shown. A sensor aggregation 910 and an actuator aggregation 908 are shown.

The graphical user interfaces 900 and 906 illustrate how a car navigation system is used to control the sauna heating temperature. If the car is approaching home and is a distance of less than 7 km from home then the sauna temperature is set to a temperature of 80 degrees Celsius. This is set using the wiring using interface 900. The interface 906 illustrates the effect of these wiring rules. The car is shown as being a distance of 7 km and thus the sauna is set to a temperature of 80 degrees Celsius.

Java portlets may be used for implementing embodiments of the invention. Portlet events provide a powerful and flexible publish/subscribe mechanism for communication between portlets. They can be used to exchange complex data between portlets and to trigger portlet activity such as updates to back end systems. In the portal, they can also interoperate with other communication mechanisms such as Cooperative portlets and click-to-action.

Concepts of the Java Portlet Specification 2.0:

Programming details for portlet events are defined in the Java Portlet Specification 2.0. Portlets can publish events by using the response.setEvent( ) call and receive events in the processEvent method. The GenericPortlet class provides a default event handling mechanism that dispatches events based on the @ProcessEvent annotation.

As a portlet programmer, declare all events that a portlet can publish or receive in the portlet.xml deployment descriptor.

The event distribution in the portal can be controlled. The Java Portlet Specification intentionally leaves open how events are passed between portlets, but only specifies how they are published and received. In IBM WebSphere Portal Version 7.0, event distribution is based on the same event broker and wiring techniques that are used to connect cooperative portlets. That means that when you place a portlet on a page, it will initially not be able to publish or receive any events. You must use the portlet wiring tool link to connect the events declared by the portlet to outputs or inputs of other portlets.

Portlets can declare localized display names and descriptions for portlet events in the application resource bundle. Provide at least a display name, as the portlet wiring tool needs this information to display event sources and targets properly.

Wires can be created between two portlets. To create a wire between two portlets, the output that the source portlet declares must match the input that the target portlet declares. This match can be on either of the following two levels:

1. The XML name that describes the semantic content of the data:
   a. For a JSR 286 events this is represented by the event names declared in portlet.xml.
   b. For collaborative portlets, this is represented by the XML name of the property type declared in the collaborative portlet WSDL.
2. The actual Java class representation of the data.

By default, the wiring tool requires a match of the semantic XML name. To avoid the requirement for a coordinated global namespace, JSR 286 portlets can declare multiple alias names for an event. This allows a portlet to connect to multiple other portlets that use different naming conventions. If the semantic XML name in the portlet section of the portlet.xml ends with a period (.), it works as a wildcard character. You can use it to match other semantic XML names defined in the portlet application section of the portlet.xml that have the same prefix. This matching scheme can be useful for handling a group of similar portlet events that have the same payload format in a uniform way.

In a case where you know that two portlets are using the same data format but have declared different XML names, for example, for common formats such as e-mail addresses, you can switch to matching on payload type, which allows you to create wires between sources and targets regardless of the XML semantic name. This can also be useful for very generic target portlets that can accept any string as input.

Embodiments of the invention addresses both areas in a new way: Connecting sensors and actuator which can both be physical and/or logical (service) instances, the user starts essentially at the very top directly with step 4 in the description above by specifying his wants and needs on a very high semantic level without ever bothering about the lower level details. The intricacies are taken care of by virtue of the combination of semantics being defined by the user at the time when he defines/request a specific situational application and the simple connections to and from all participating elements. The way in which this specification takes place, leverages the concepts from wiring portlets and applies this to the more general case of physical devices and/or services.

Let MyCollect be the personalized central focus point in the cloud where a user can register/deregister and maintain all his devices/sensors/actuators.

The approach proposed in this invention still requires the registration (and thus connection) of my sensors and actuators to MyCollect. However, the definition of the interface can be semantically very high level and abstract. E.g. my Smartphone might be made known to MyCollect (among others) as a location sensor. My Sauna at home might be made know to MyCollect as an actuator that can be turned on/off and optionally also as a sensor for it status on/off. The interface in all cases being technically simply a flat string type (or other basic type like Boolean for on/off) without further semantics pertaining to its intended use or anything else attached.

Referring to FIG. 9, Using the Smartphone location and the Sauna actuator together with a date/time service (as an always available sensor), the user can simply 'wire' the following situational application. "When it is Friday after 17:00h and I am approaching my house to more than 30 km I want the Sauna to be automatically turned on, so that it is ready to use when I finally arrive at home."

Neither Sauna, nor Smartphone, nor timing service need to know anything about the semantics of the situational application they are involved in. The connection is semantically made by the intelligent user. The user does not need to know anything about the protocols that the Sauna or the Smartphone use. The Sauna and Smartphone only need to implement very simple high level interfaces. The system is principally open and scalable. The more elements are known to MyCollect, the more possibilities and capabilities become available. No changes need to be made to any existing element because of other elements added to the system. The 'smart' is provided by the user expressing his wants/needs. Privacy aspects can be properly handled because each element is via registration explicitly bound to the user and remains under his control with respect to all possible information flow/actions.

As described herein the invention provides for a computer system and a method for connecting network connectable devices by a user interface in the independent claims. Embodiments are given in the dependent claims.

Embodiments of the invention address the above and other problems by integrating sensor appliances using a device register. The device register creates a device object for each sensor appliance and exposes at least one parameter of the sensor appliance. This enables an aggregation model to aggregate the exposed parameters from each of the sensor appliances. The aggregation of the sensors could, for example, be achieved by implementing the device objects as java portlets. A wiring broker can then be used to update the aggregation model and the aggregation model can be used for creating a web based user interface. In addition to aggregating sensors this enables the combination of software surfaces into the aggregation model. This may have the benefit of creating a system which is easily scalable and integrates both sensor appliances, software services, and/or web services.

A 'computer-readable storage medium' as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Examples of computer-readable storage media include, but are not limited to: a floppy disk, punched tape, punch cards, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network. References to a computer-readable storage medium should be interpreted as possibly being multiple computer-readable storage mediums. Various executable components of a program or programs may be stored in different locations. The computer-readable storage medium may for instance be multiple computer-readable storage medium within the same computer system. The computer-readable storage medium may also be computer-readable storage medium distributed amongst multiple computer systems or computing devices.

'Computer memory' or 'memory' is an example of a computer-readable storage medium. Computer memory is any memory which is directly accessible to a processor. Examples of computer memory include, but are not limited to: RAM memory, registers, and register files. References to 'computer memory' or 'memory' should be interpreted as possibly being multiple memories. The memory may for instance be multiple memories within the same computer system. The memory may also be multiple memories distributed amongst multiple computer systems or computing devices.

'Computer storage' or 'storage' is an example of a computer-readable storage medium. Computer storage is any non-volatile computer-readable storage medium. Examples of computer storage include, but are not limited to: a hard disk drive, a USB thumb drive, a floppy drive, a smart card, a DVD, a CD-ROM, and a solid state hard drive. In some embodiments computer storage may also be computer memory or vice versa. References to 'computer storage' or 'storage' should be interpreted as possibly being multiple storage. The storage may for instance be multiple storage devices within the same computer system or computing device. The storage may also be multiple storages distributed amongst multiple computer systems or computing devices.

A 'computer system' as used herein encompasses to any device comprising a processor. A 'processor' as used herein encompasses an electronic component which is able to execute a program or machine executable instruction. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. Many programs have their instructions performed by multiple processors that may be within the same computing device or which may even be distributed across multiple computing devices.

A 'display' or 'display device' as used herein encompasses an output device or a user interface adapted for displaying images or data. A display may output visual, audio, and or tactile data.

As described herein, one aspect the invention provides for a computer system comprising a device register for creating and registering one or more device objects. At least one device object of the one or more device objects is configured for communicating with a network connector of a sensor appliance via a network connection. The device object is configured for exposing at least one parameter of the sensor appliance by declaring its capabilities. A sensor appliance as used herein encompasses any device which is configured for making a physical measurement and/or controlling a device or apparatus which interacts with the physical world. For instance a sensor appliance may comprise a sensor which takes a measurement. An example would be a temperature sensor. A sensor appliance may also encompass something which controls a physical apparatus or machine. For instance a sensor appliance could control actuators on a solar panel or a window system. The computer system further comprises an aggregation model for aggregating the at least one parameter of the at least one device object.

The aggregation model may aggregate parameters from other device objects and/or software services. The computer system further comprises a set of wiring definitions descriptive of raised events created by changes or updates in the at least one parameter. For instance, if the value of a parameter changes the parameter change may raise an event. For instance the value of a temperature may go above or below a particular value. This raises an event which causes a response defined by the wiring definition. The computer system further comprises a wiring broker for updating the aggregation model in accordance with the raised event. In some embodiments the device register provides portlets via the device objects which can be connected together using wiring. For instance the IBM Web Sphere Portal System may be used for providing the wiring, the aggregation model, and the wiring broker in some embodiments. This embodiment may be beneficial because it provides a method of integrating sensor appliances into systems typically used for integrating web services. The network appliances can therefore be controlled via user interfaces such as user interface displayed on a web browser.

In another embodiment the computer system is a portal server.

In another embodiment the at least one parameter is exposed by declaring its capabilities. This may include parameters such as the type of devices, and the input and/or output parameters in an abstraction layer.

In another embodiment the computer system further comprises devices represented by device objects which can provide hardware-based sensor information. They can react as hardware-based actuators, and they can also represent physical multi-functional devices or even software-based internet services.

In another embodiment the abstraction layer provides the infrastructure to receive and/or poll for status changes of sensors and trigger status changes of actuators.

In another embodiment the wire broker is configured for connecting device capabilities of different devices with each other in order to build situational applications. For instance a situational application may be a mashup.

In another embodiment the computer system further comprises a memory for storing machine executable instructions. Execution of the instructions causes the processor to connect a network connectable device to a network using the network connection. The network connectable device may be the sensor appliance. Execution of the instructions further causes the processor to visualize the network connectable device on a user interface using an abstraction layer. Visualizing the network connectable device on a user interface using an abstraction layer may be equivalent with displaying data aggregated from the network connectable device on a graphical user interface of a display. Visualizing the network connectable device on a user interface may also be equivalent with displaying aggregated data on a graphical user interface rendered by a web browser. The network connectable device is any one of the following: a sensor, an actuator, a multifunction device, and an internet service.

Execution of the instructions further causes the processor to register the device with the abstraction layer and declare its capabilities using the device register by connecting the device with the user interface using the abstraction layer. In some embodiments the abstraction layer may be equivalent with the device object that is created by the device registry.

Execution of the instructions further causes the processor to wire the network connectable device using the abstraction layer for implementing a user-defined controller logic with a coherent system of decoupled devices. The abstraction layer provides the infrastructure to receive and/or poll for status changes of sensors and trigger status changes of actuators. The abstraction layer is a device and/or service independent by using a software abstraction layer.

In another embodiment the network is for example the internet.

In another embodiment the user interface for example may be a webpage used as a platform. This may be performed in some embodiments via a web service.

In another embodiment each device registered with the abstraction layer declares its capabilities. This may include the type of device and the input and output parameters.

In another embodiment the computer system further comprises a memory for storing machine executable instructions. Execution of the instructions causes a processor to connect the sensor appliance to a network via the network connector. Execution of the instructions further causes the processor to register the sensor appliance with the device register. Execution of the instructions further causes the processor to create a device object for the registered sensor appliance using the device register. Execution of the instructions further causes the processor to provide at least one parameter of the sensor appliance via the device object. This embodiment may be beneficial because it provides an easy way of integrating a sensor appliance into a user interface. This may be particularly beneficial when integrating sensors into a portal server.

In another embodiment the sensor appliance is connected to the network via a web service.

In another embodiment execution of the instructions further cause the processor to receive an updated value by the device object, wherein the device appliance provides the updated value. Execution of the instructions further causes the processor to update the at least one parameter in accordance with the updated value. The device object may update the at least one parameter. Execution of the instructions further cause the processor to raise at least one event caused by updating the at least one parameter. Execution of the instructions further causes the processor to update the aggregation model in accordance with the at least one raised event.

Execution of the instructions further causes the processor to create webpage data in accordance with the aggregation model. The webpage data as used herein encompasses data which may be displayed or used by a web browser to provide a graphical user interface. This may include HTML, XML, and applets such as Java Applets. Execution of the instructions further causes the processor to provide the webpage data in response to a webpage request. The computer system may function as a web server and provide the webpage data in response to the webpage request. This embodiment may be beneficial because it provides for an effective way of integrating sensors into a graphical user interface which may be displayed on a web browser. The web browser may be used to display data from the sensor appliances and also to send data to control the operation and function of the sensor appliances.

In another embodiment the computer system is a portal server or a web server.

In another embodiment the device object is configured for semantic mapping of the exposed at least one parameter of the sensor appliance. For instance the computer system may comprise computer executable code for implementing a semantic mapper. A semantic mapper as used herein is a tool or software service that aids in the transformation of data elements from one name space into another name space. This may be particularly beneficial because it may help to integrate the sensor appliances in a meaningful way into a user interface.

In another embodiment the computer system further comprises a webpage aggregator for serving a webpage constructed in accordance with the aggregation model. The webpage aggregator may be computer executable code which is used to construct a page data which may be sent in response to a webpage request. The webpage aggregator uses the aggregation model to aggregate the data in order to construct the webpage.

In another embodiment the webpage is configured for displaying an aggregation of the exposed parameters of the device objects. This embodiment may be particularly beneficial because it provides a user interface which a user may use for collectively using the information and/or controlling the various sensor appliances.

In another embodiment the device register is configured for verifying access authorization of the one or more device objects using an identity verification service. This may be beneficial because the one or more device objects may be connected via the internet and may be at multiple locations. The use of an identity verification service enables integration of the sensor appliances via the device objects. The individual sensor appliances can be granted individual user identities that may enable the devices to retrieve user profile data to make proper decisions. This may also enable devices to modify user profile data or some kind of state information to set certain state informations or conditions on behalf of a user. This also enables devices to interact with each other. This also enables devices to act autonomously to trigger certain actions by those device appliances.

In another embodiment the sensor appliance is a sensor.

In another embodiment the sensor appliance is an actuator.

In another embodiment the sensor appliance is a controller.

In another embodiment the sensor appliance is a multifunction device. A multifunction device may include features of a sensor, an actuator, and a controller.

In another embodiment the sensor appliance is an internet service.

In another embodiment the device object is configured for any one of the following: to send status updates of a property value, receive status change requests, declare sensor or actuator parameter values to expose, and combinations thereof.

In another embodiment the exposed parameter is any one of the following: data to receive, actuator parameters to set, data values to set, and a configuration value to set.

In another embodiment the device registry is further adapted for registering and creating device objects for software services. This embodiment is particularly advantageous because the sensor appliances and the software services can be integrated as equivalents. This allows the easy integration of the sensor appliances and the software services to be interoperable and to use cooperative function.

In another embodiment the service system further comprises a wiring editor for modifying and/or creating the set of wiring definitions.

In another embodiment the portal service system comprises multiple instances of the device registry. This may be particularly advantageous because different types of devices may use diverse device registries. For instance if one had a Smartphone which was integrated as a sensor appliance the telecom provider may provide the device registry for this device. An alarm system or home control system may use a device registry provided by the service company of the alarm system or home control system. Using multiple device registries may enable more diverse networks of sensor appliances to be integrated.

In another aspect the invention provides for a method of connecting network connectable independent devices via a user interface comprising connecting the sensor or actuator appliance to a network. The method further comprises visualizing each network connectable device on the user interface by an abstraction layer. The network connectable device belongs to the type sensor and/or actuator. The method further comprises the step of registering each device with said abstraction layer and declaring its capabilities by connecting it with said user interface including the abstraction layer. The method further comprises the step of wiring selected network connectable devices with selected other devices using the abstraction layer in order to implement a user defined controllable logic with a coherent system of decoupled devices. The abstraction layer provides the infrastructure to poll for status changes of sensors and triggers a status changes of actuators. The abstraction layer is device and/or service independent by using a software abstraction layer.

In another aspect the invention provides for a method of connecting a sensor appliance to a portal server system. The method comprises the step of connecting the sensor appliance to a network via a web service. The method further comprises the step of registering the sensor appliance with a device register using the web service. The method further comprises the step of creating a device object for the registered sensor appliance. The method further comprises the step of providing at least one parameter of the sensor appliance via the device object.

In another embodiment the method further comprises the step of sending an updated value by the device appliance. The method further comprises the step of updating the at least one parameter in accordance with the update value. The method further comprises the step of raising at least one event caused by updating the at least one parameter. The method further comprises the step of updating an aggregation model in accordance with the at least one raised event. The method further comprises the step of creating webpage data in accordance with the aggregation model. The method further comprises the step of providing the webpage data in response to a webpage request.

In another aspect the invention provides for a non-transitory computer-readable storage medium comprising machine executable instructions for execution by a processor. Execution of the instructions causes the processor to connect the server appliance to a network via a web service. Execution of the instructions further causes the processor to register the sensor appliance with a device registry using the web service. Execution of the instructions further causes the processor to create a device object for the registered sensor appliance. Execution of the instructions further causes the processor to expose at least one parameter of the sensor appliance using the device object.

What is claimed is:

1. A computer system, comprising:
   a memory; and
   a processor, the processor communicatively coupled to the memory, the processor configured to:
      register, by a device register, a plurality of device objects, wherein each device object of the plurality of device objects is configured for communicating with a network connector of a corresponding device of a plurality of devices via a network connection, wherein each device object is configured for exposing a parameter of the corresponding device of the plurality of devices; wherein each exposed parameter declares capabilities of the corresponding device of the plurality of devices;
      aggregate, by an aggregation model, the exposed parameters of the plurality of devices; and
      update, by a wiring broker the aggregation model in accordance with at least one raised event, wherein the at least one raised event results from an updated value of a given exposed parameter of one of the plurality of devices.

2. The computer system of claim 1, wherein the processor is further configured to:
   connect a first device of the plurality of devices to the network using the network connection;
   display the first device on a user interface using an abstraction layer, wherein the first device is selected from a group consisting of a sensor, an actuator, a multifunction device, and an internet service;
   register the first device with the abstraction layer to declare the capabilities of the first device using the device register; and
   wire the first device using the abstraction layer for implementing a user defined controller logic with a coherent system of decoupled devices, wherein said abstraction layer provides the infrastructure to receive/poll for status changes of sensors and to trigger status change of actuators, wherein said abstraction layer is device and/or service independent.

3. The computer system of claim 1, wherein the processor is further configured to:
   connect a first device of the plurality of devices to the network via a network connector;
   register the first device with the device register;
   create a first device object for the registered first device using the device register; and
   provide a first parameter of the first device via the first device object.

4. The computer system of claim 3, wherein the processor is further configured to:
   receive an updated value of the first parameter by the first device object from the first device;
   update a first exposed parameter of the device register in accordance with the updated value
   determine a first raised event caused by the updated value of the first parameter;
   update the aggregation model in accordance with the determined updated value;
   create webpage data in accordance with the updated aggregation model; and
   provide the webpage data in response to a webpage request.

5. The computer system of claim 1, wherein the computer system is selected from a group consisting of a portal server and a web server.

6. The computer system of claim 5, wherein the portal server comprises multiple instances of the device registry.

7. The computer system of claim 1, wherein each device object of the plurality of device objects is configured for semantic mapping of the exposed parameters of the plurality of devices.

8. The computer system of claim 1, wherein the computer system further comprises a webpage aggregator for serving a web page constructed in accordance with the aggregation model.

9. The computer system of claim 8, wherein the webpage is configured for displaying an aggregation of the exposed parameters of the each device.

10. The computer system of claim 1, wherein the device register is configured for verifying access authorization of the plurality of device objects using an identity verification service.

11. The computer system of claim 1, wherein each device is selected from a group consisting of a sensor, an actuator, a multifunction device, and an internet service.

12. The computer system of claim 1, wherein each device object is configured to:
    send status updates of a property value,
    receive status change requests, and
    declare sensor or actuator parameter values to expose.

13. The computer system of claim 1, wherein a given exposed parameter is selected from a group consisting of data to retrieve, actuator parameter to set, data value to set, and configuration value to set.

14. The computer system of claim 1, wherein the device register is further adapted for registering and creating device objects for software services.

15. A method for connecting network connectable devices by a user interface, the method comprising:
    connecting network connectable devices to a network;
    visualizing each network connectable device on said user interface by an abstraction layer, wherein each of said network connectable devices is selected from a group consisting of a sensor and an actuator;
    registering each network connectable device with said abstraction layer to declare the capabilities of each registered network connectable device in said user interface; and
    selecting a first network connectable device of the network connectable devices as a source of an event or wire and a second network connectable device of the network connectable devices as a target of an event or wire via said abstraction layer, wherein said abstraction layer provides an infrastructure to poll for status changes of sensors and to trigger status change of actuators, and wherein said abstraction layer is device and/or service independent.

* * * * *